PROTECTOR FOR ELECTRIC CIRCUITS

Original Filed July 29, 1970

United States Patent Office

Re. 27,802
Reissued Oct. 30, 1973

27,802

PROTECTOR FOR ELECTRIC CIRCUITS

Aloysius J. Fister, St. Louis, Mo., assignor to McGraw-Edison Company, Elgin, Ill.

Original No. 3,644,861, dated Feb. 22, 1972, Ser. No. 59,101, July 29, 1970. Application for reissue Feb. 23, 1973, Ser. No. 335,104

Int. Cl. H01h *85/16*

U.S. Cl. 337—252 16 Claims

Matter enclosed in heavy brackets [ ] appears in the original patent but forms no part of this reissue specification; matter printed in italics indicates the additions made by reissue.

ABSTRACT OF THE DISCLOSURE

An electric fuse has a ceramic housing with annular grooves adjacent the opposite ends of the outer surface thereof, and has yieldable annuli disposed within those annular grooves. Those yieldable annuli make it possible to "cold-form" the confronting edges, of the cuplike terminals of that electric fuse, into those annular grooves without cracking, pulverizing or fragmenting the endmost edges of those annular grooves. Also, those yieldable annuli coact with those confronting edges to limit the rate at which gases and vapors can escape from that electric fuse.

Figure 1:
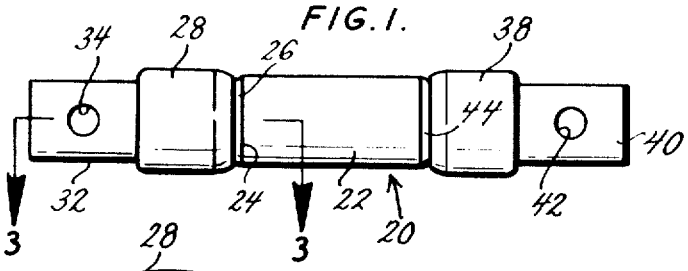

This invention relates to improvements in protectors for electric circuits. More particularly, this invention relates to improvements in electric fuses which utilize ceramic housings.

It is, therefore, an object of the present invention to provide an improved electric fuse which uses a ceramic housing.

It would be desirable to use ceramic housings as parts of the enclosures for electric fuses; because such housings are less expensive than glass melamine housings, are dimensionally stable, and are not subject to heat degradation. While ceramic housings have been used as parts of the enclosures for some electric fuses, the problems of securing the terminals of electric fuses to ceramic housings are formidable. For example, the unyieldable nature of the material of ceramic housings, and the unavoidable variations in the dimensions of those housings, make it impractical to try to crimp cuplike terminals onto the ends of those housings. Also, the frangible nature of the material of ceramic housings, and the unavoidable variations in the dimensions of those housings, make it impractical to try to crimp the confronting edges of cuplike terminals into annular grooves in the outer surfaces of those housings. In some cases, manufacturers have carefully machined the inner surfaces of cuplike terminals, and have carefully ground the opposite ends of the outer surfaces of ceramic housings, for electric fuses; and have then pressed those terminals onto the opposite ends of those ceramic housings. However, the cost of carefully machining the inner surfaces of cuplike terminals, and the cost of carefully grinding the opposite ends of the outer surfaces of ceramic housings, for electric fuses are quite high—and can be prohibitive. In other cases, manufacturers have metallized the ends of ceramic housings, and have then soldered terminals onto those metallized ends. However, the metallizing of the ends of ceramic housings is a costly and highly specialized process. It would be desirable to provide an electric fuse which has a ceramic housing with annular grooves adjacent the opposite ends of the outer surface thereof, and which has cuplike terminals with the confronting edges thereof "cold formed" into those annular grooves. The present invention provides such an electric fuse; and it does so by disposing yieldable annuli within the annular grooves adjacent the opposite ends of the outer surface of the ceramic housing of that electric fuse. Those yieldable annuli will respond to the forces which are applied to the confronting edges of cuplike terminals, as those terminals are assmbled with those ceramic housings, to permit those confronting edges to cold-form into those annular grooves. However, those yieldable annuli keep the cold-forming terminals from cracking, pulverizing or fragmenting the endmost edges of the annular grooves in the ceramic housing. Further, those yieldable annuli coact with the confronting edges of the terminals to limit the rate at which gases and vapors can escape from the electric fuse. It is, therefore, an object of the present invention to provide an electric fuse which has a ceramic housing with annular grooves adjacent the opposite ends of the outer surface thereof, which has yieldable annuli disposed within those annular grooves, and which has the confronting edges of cuplike terminals thereof cold-formed into those annular grooves and into those yieldable annuli.

It frequently is desirable to fabricate each of the cuplike terminals of an electric fuse from two or more pieces of metal rather than to cast that terminal. However, the fabricating of a cuplike terminal from two or more pieces of metal frequently necessitates a number of individually different soldering or heating operations. It would be desirable to provide a cuplike terminal for an electric fuse which was made from two or more pieces of metal and which could be soldered into unitary form at the same time the fusible element of that electric fuse was soldered to that terminal. The present invention provides such a terminal; and it does so by providing a cuplike portion and a bladelike portion which can be soldered to that cuplike portion at the same time the fusible element of the electric fuse is soldered to that cuplike portion.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 2:
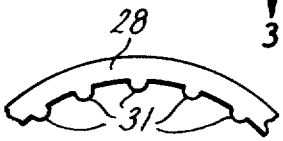
Figure 5:
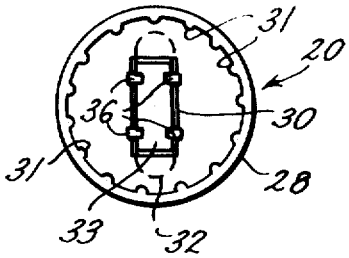
Figure 3:
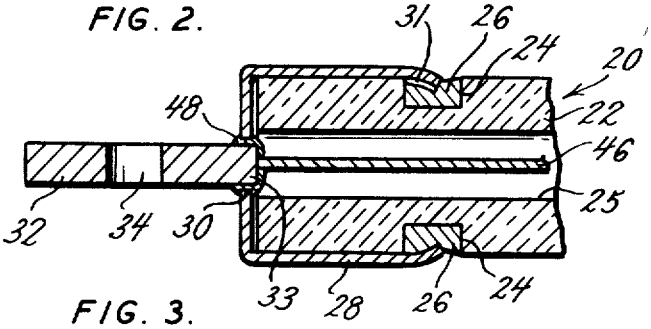
Figure 6:
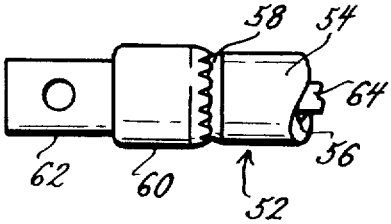
Figure 4:
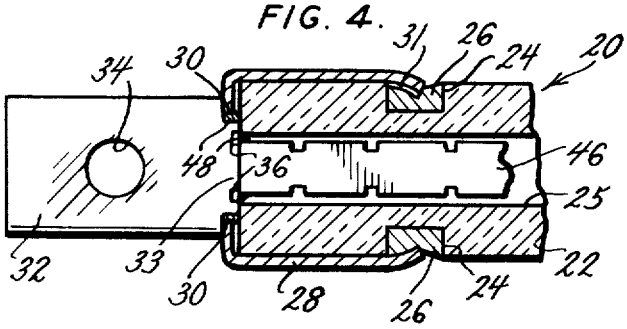
Figure 7:
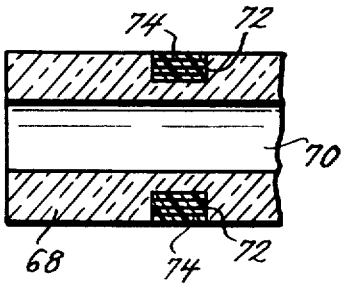
Figure 10:
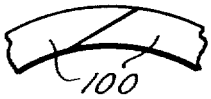
Figure 11:
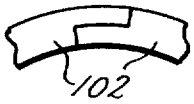
Figure 12:
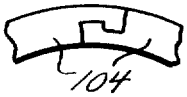
Figure 8:
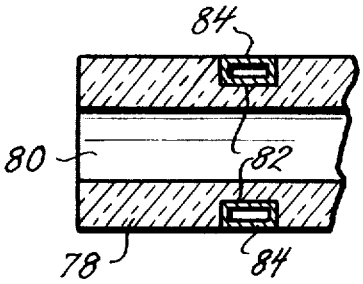
Figure 9:
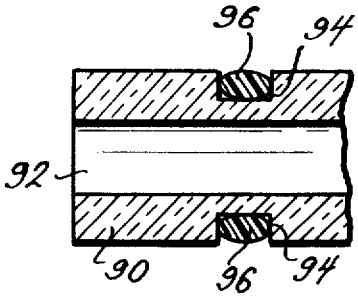

In the drawing,

FIG. 1 is a side elevational view of one preferred embodiment of electric fuse that is made in accordance with the principles and teachings of the present invention, FIG. 2 is an end view, on a much larger scale, of a portion of the free edge of a cuplike terminal for the electric fuse of FIG. 1, FIG. 3 is a sectional view, on a scale intermediate those of FIGS. 1 and 2, through part of the electric fuse shown in FIG. 1, and it is taken along the plane indicated by the line 3—3 in FIG. 1, FIG. 4 is a sectional view, on the scale of FIG. 3, through the portion of the electric fuse of FIG. 1 which is shown in FIG. 3, but it is taken along a plane that is spaced 90° from the plane indicated by the line 3—3 in FIG. 1, FIG. 5 is an elevational view, on the scale of FIG. 3, of the interior of the cuplike terminal shown in FIGS. 3 and 4, before that terminal has the free edge thereof cold-formed into assembled relation with the ceramic housing of the electric fuse of FIGS. 1–4, FIG. 6 is an elevational view of one end of a second preferred embodiment of electric fuse that is made in accordance with the principles and teachings of the present invention, FIG. 7 is a sectional view through one end of a ceramic housing that can be used in making a third preferred embodiment of electric fuse, FIG. 8 is a sectional view through one end of a ceramic housing that can be used in making a fourth preferred embodiment of electric fuse, FIG. 9 is a sectional view through one end of a ceramic housing that can be used in making a fifth preferred embodiment of electric fuse, FIG. 10 is an enlarged view of the overlapped ends of one form of yieldable annulus that is provided by the present invention, FIG. 11 is an enlarged view of the overlapped ends of another form of yieldable annulus that is provided by the present invention, and FIG. 12 is an enlarged view of the overlapped ends of a further form of yieldable annulus that is provided by the present invention.

Referring to the drawing in detail, the numeral 20 generally denotes one preferred embodiment of electric fuse that is made in accordance with the principles and teachings of the present invention. That electric fuse has a housing 22 of ceramic material which has a high heat conductivity; and that housing will enable that electric fuse to dissipate relatively large quantities of heat. The numeral 24 denotes an annular groove which is formed in the outer surface of the housing 22 adjacent the left-hand end of that housing. The numeral 25 denotes a cylindrical passage which extends axially of the housing, and, while just one passage 25 is shown in FIGS. 3 and 4, the housing 22 will usually have several axially directed cylindrical passages therein. The numeral 26 denotes a yieldable annulus which is disposed within the annular groove 24; and that yieldable annulus must have an elastic limit which is smaller than the elastic limit of the ceramic material of the housing 22. Examples of materials which could be used in the yieldable annulus 26 are Teflon, filled Teflon, silicon rubber, neoprene, hard rubber, aluminum, soft copper, zinc, lead and tin. Actually, almost any material that has an elastic limit which is smaller than the elastic limit of the ceramic material of the housing 22, tht is not degraded by heat, light, air, moisture and the like, and that has a long useful life, could be used in making the yieldable annulus 26. Where that yieldable annulus is made from an essentially inelastic material, it can be made as a split ring, or it can be made as an elongated strip which is wound into the annular groove 24 as a number of layers. Where the yieldable annulus 26 is made from an elastomeric material, it can be made as a continuous ring.

The numeral 28 denotes a cuplike ferrule; and that ferrule will usually be made from a ductile metal of high conductivity, such as soft copper. The ferrule 28 has a generally rectangular slot 30 formed in the closed end thereof, as shown particularly by FIGS. 3 and 4; and it has axially directed ridges 31 at the interior thereof adjacent the free edge thereof, as shown particularly by FIGS. 2–5. A securing blade 32 has a narrow end 33 which telescopes through the generally rectangular slot 30 in the closed end of the ferrule 28. The inner face of the narrow end 33 of the securing blade 32 is staked, as at 36, to mechanically connect that securing blade to the ferrule 28. The portion of the securing blade 32 which extends outwardly from the closed end of the ferrule 28 has an opening 34 therein; and that opening can accommodate a bolt which can be used to hold the securing blade 32 in electrically conducting relation with a bus bar or the like. The ferrule 28 and the securing blade 32 constitute a cuplike knife-blade terminal for the electric fuse 20.

The numeral 38 denotes a ferrule, and the numeral 40 denotes a securing blade which is staked thereto; and the portion of that securing blade which extends outwardly from the closed end of that ferrule has an opening 42 therein. The ferrule 38 and the securing plate 40 can be identical to the ferrule 28 and the securing blade 32, respectively; and the narrow portion, not shown, of the securing blade 40 can be staked into assembled relation with the closed end of the ferrule 38. A yieldable annulus 44, which can be identical to the yieldable annulus 26, is disposed within an annular recess adjacent the right-hand end of the electric fuse 20, as that electric fuse is viewed in FIG. 1.

The numeral 46 denotes a fusible element which is disposed within the passage 25 in the housing 22; and one end of that fusible element is immediately adjacent the narrow end 33 of the securing blade 32, while the other end of that fusible element is immediately adjacent the narrow end, not shown, of the securing blade 40. The numeral 48 denotes solder which fills the gap between the slot 30, in the closed end of the ferrule 28, and the adjacent surfaces of the securing blade 32, and that solder also bonds the left-hand end of the fusible element 46 to that securing blade, as that fusible element and securing blade are viewed in FIGS. 3 and 4.

The yieldable annulus 26 preferably has the outer surface thereof flush with the exterior of the housing 22 prior to the time the free edge of the ferrule 28 is telescoped over the left-hand end of that housing. The free edge of the ferrule 28 can be cold-formed into the annular groove 24 and into the yieldable annulus 26 by rolling, crimping or pressing operation. As the free edge of that ferrule is cold-formed into that annular groove, that free edge will cold-form the yieldable annulus 26, as shown particularly by FIGS. 3 and 4. As a result, the free edge of the ferrule 28 will be effectively locked in engagement with the yieldable annulus 26; and accidental separation of that ferrule from the housing 22 will be effectively prevented. As the yieldable annulus 26 is deformed in the manner shown by FIGS. 3 and 4, restorative forces will be developed within that yieldable annulus; and those restorative forces will provide an intimate engagement between that yieldable annulus and the interior of the cold-formed free edge of the ferrule 28. That intimate engagement will coact with the ridges 31 at the interior of that free edge of that ferrule to effectively prevent accidental rotation of the ferrule 28 relative to the housing 22. Also, the engagement between the yieldable annulus 26 and the interior of the free edge of the ferrule 28 will be so tight and so intimate that no filler and flame could escape through the joint between the ferrule 28 and the yieldable annulus 26 when the fusible element 46 fuses.

The electric fuse shown by FIGS. 1–5 can be made quite small, and yet can be quite strong; because of its ceramic housing 22 and because of the intimacy of engagement between that housing and the ferrules 28 and 38. For example, the electric fuse of FIGS. 1–5 can have a rating of 60 amperes at 600 volts, even though the overall length of the housing 22 is about 2 inches long. By providing the housing 22 with a plurality of passages 25, rather than just the single passage 25 shown by FIGS. 3 and 4, it is possible to provide an electric fuse which can be rated at 400 amperes at 600 volts and which has a housing 22 of about 2 inches long and about 1 and ¾ inches in diameter.

Ordinarily it is not necessary to provide a hermetic seal between the housing 22 and the ferrules 28 and 38. Instead, engagements between that housing and those ferrules which are sufficiently intimate to keep flame from being expelled through the joints between those ferrules and that housing, as the fusible element 46 fuses, are acceptable. However, if hermetic seals are required between the ferrules 28 and 38 and the housing 22, such seals can be provided by appropriate seelction of the material used in the yieldable annuli 26 and 44 and by the provision of sufficient deformation of the free edges of the ferrules 28 and 38 to deeply cold form those yieldable annuli.

By making cuplike knife-blade terminals from the ferrule 28 and the securing blade 32 and from the ferrule 38 and the securing blade 40, the present invention provides the advantages of "outside soldering" of the fusible element 46 of the electric fuse 20, while also enabling the component parts of those cuplike knife-blade terminals to be soldered together at the same time the fusible element 46 is soldered to those cuplike knife-blade terminals. Specifically, the reduced-width portion 33 of the securing blade 32 can be staked to the ferrule 28, the free edge of that ferrule can be telescoped over the left-hand end of the housing 22 and over the left-hand edge of the yieldable annulus 26 within the annular groove 24, a pellet of solder can be introduced into the passage 25, and then the fusible element 46 can be introduced into that passage. The housing 22 will preferably be set so that axis thereof is vertical, and so the ferrule 28 and the securing blade 32 are adjacent the lower end of that housing; and then heat will be applied to that securing blade and to that ferrule. That heat will melt the solder, and will enable that solder to bond that ferrule and that securing blade to each other and to bond the fusible element 46 to the reduced-width portion of that securing blade. The fusible element 46 could, if desired, be spaced from the inner surface of the passage 25 by a suitable jig while the fusible element was being soldered to the reduced-width portion of the securing blade 32 and while that securing blade was being soldered ot the ferrule. However, because the diameter of the passage 25 is just slightly larger than the width of the fusible element 46, the inner surface of that passage will hold that fusible element so close to the center of that passage that a centering jig will not ordinarily be needed.

After the ferrule 28, the securing plate 32 and the fusible element have been soldered to each other, the free edge of that ferrule will be cold-formed into the annular groove 24 and into the yieldable annulus 26. At such time, the cuplike knife-blade terminal, composed of ferrule 28 and securing blade 32, will be fixedly secured to the housing 22; and the fusible element 46 will be mechanically secured and electrically connected to that cuplike knife-blade terminal.

The passage 25 will then be filled with an arc-quenching material such as sand, a pellet of solder will be placed within the upper end of that passage, the securing blade 40 will be staked to the ferrule 38 and the free edge of that ferrule will be telescoped downwardly over the upper end of the housing 22 and over the upper edge of the yieldable annulus 44, and then the resulting assembly will be inverted and its lower end subjected to heat. Thereupon, the solder pellet within that lower end will melt and will bond the ferrule 38 and the securing balde 40 together while mechanically securing and electrically connecting the free end of the fusible element 46 to that securing blade. Thereafter, the free edge of the ferrule 38 will be cold-formed into the yieldable annulus 44 and into the annular groove for that yieldable annulus. As such time, the cuplike knife-blade terminal, composed of ferrule 38 and securing blade 40, will be fixedly secured to the housing 22, and the fusible element 46 will be mechanically secured and electrically connected to that cuplike knife-blade terminal.

Not only will the cuplike knife-blade terminals be permanently secured to the opposite ends of the housing 22, but those cuplike knife-blade terminals will be kept from rotating relative to that housing. In addition, the engagements between the free edges of the ferrules of those cuplike knife-blade terminals and the yieldable annuli 26 and 44, respectively, will be so intimate that no flame will be able to escape from the electric fuse 20 when the fusible element 46 fuses.

Where the yieldable annuli [24] *26* and 44 are made of elastomeric material, those yieldable annuli can be stretched to make the diameters thereof larger than the outer diameters of the housing 22. Then, after those yieldable annuli have been telescoped over the opposite ends of that housing and set in register with the annular grooves therefor, these yieldable annuli can be permitted to retract into position within those annular grooves. Where the yieldable annuli [24] *26* and 44 are made of metal, those yieldable annuli can have the ends thereof spread far apart to enlarge the diameters of those yieldable annuli until those yieldable annuli can be telescoped over the opposite ends of the housing 22. Thereafter, the ends of the yieldable annuli 26 and 44 can be pressed into overlapping relation with each other. Where the yieldable annuli 26 and 44 are made of Teflon, or the like, those yieldable annuli will be wound into the annular grooves therefor to build up multilayer yieldable annuli. In all instances, the yieldable annuli 26 and 44 will substantially fill the annular grooves therefor. As a result, when the free edges of the ferrules 28 and 38 are being cold-formed into those annular grooves, the inner surfaces of those ferrules will quickly engage, and receive support from, those yieldable annuli. This is important; because it means that those yieldable annuli will receive and withstand some of the inwardly directed forces which the ferrules 28 and 38 would otherwise apply primarily to the portions of the housing 22 that define the axially outer edges of the annular groove 24 and of the annular groove for the yieldable annulus 44. The overall results is that the forces which those ferrules apply to the portions of the housing 22 which define the axially outer edges of the annular groove 24 and of the annular groove for the yieldable annulus 44 are too small to crack, break or crumble those edges. As a result, the yieldable annuli provided by the present invention make it possible to secure cuplike terminals to the ceramic housings of electric fuses in a fixed and intimate manner without cracking, breaking or crumbling any edges of those housings.

The ridges 31 at the inner surfaces of the ferrules 28 and 38 will force their way into the yieldable annuli 26 and 44, respectively, as the free edges of those ferrules are cold-formed into those yieldable annuli. The resulting engagement between those ridges and those yieldable annuli will positively prevent rotation of those ferrules relative to the housing 22. If desired, however, the ridges 31 could be eliminated. In such event, the ferrules 28 and 38 could be kept from rotating relative to the housing 22 by forcing the free edges of those ferrules even deeper into the yieldable annuli 26 and 44, respectively; because such deeper penetration of those yieldable annuli would cause the outer surfaces of those yieldable annuli to intimately engage the inner surfaces of those ferrules, and thereby effectively resist any relative rotation of those ferrules.

FIG. 6 shows an electric fuse 52 that has a ceramic housing 54 with an axially directed passage 56 therein. A yieldable annulus 58 is disposed within an annular groove in the exterior of the housing 56 adjacent the left-hand end of that housing. The housing 54 can, if desired, be identical to the housing 22 of the electric fuse 20. A cuplike knife-blade terminal, composed of ferrule 60 and securing blade 62, is provided at the left-hand end of that housing. A fusible element 64 extends through the passage 56 in the housing 54; and the left-hand end of that fusible element is soldered to the inner end of the securing blade 62. The ferrule 60 and the securing blade 62 can be identical to the ferrule 28 and the securing blade 32 of the electric fuse 20; except that the inner surface of the ferrule 60 is devoid of ridges 31, and except that indentations are formed in the free edge of the ferrule 60 as that free edge is coldformed into the yieldable annulus 58. These indentations, like the ridges 31 at the inner surface of the ferrule 28, will positively prevent relative rotation of ferrule 60 and housing 54.

FIG. 7 shows one end of a housing 68 which has a passage 70 therethrough, and which has an annular groove 72 adjacent the left-hand end of the outer surface thereof. That housing, that passage, and that annular groove can be identical to the housing 22, the passage 25, and the annular groove 24 of the electric fuse 20. A yieldable annulus 74 is disposed within the annular groove 72; and that yieldable annulus consists of an elongated thin strip of Teflon which is wound into the annular groove 72 to form a multilayer yieldable annulus. That yieldable annulus will yield to accommodate the free edge of a ferrule; but, in doing so, it will support and withstand enough of the forwardly directed forces, applied by that ferrule, to keep the portion of housing 68 which defines the axially outer edge of annular groove 72 from breaking, cracking and crumbling.

The multi layer yieldable annulus 74 of FIG. 7 is essentially continuous in nature, and thus is free of the joint which initially exists between the ends of a yieldable annulus of metal. Also, that multi layer yieldable annulus can be made of tougher and sturdier material than can yieldable annuli which are made of elastomeric materials. However, it takes longer to form the multi layer yieldable annulus 74 than it does to insert an elastomeric or metal yieldable annulus within an annular groove.

FIG. 8 shows the left-hand end of a housing 78 which has a passage 80 therein and which has an annular groove 82 adjacent the left-hand end thereof. The housing 78, the passage 80 and the annular groove 82 can be identical to the housing 22, the passage 25 and the annular groove 24 of the electric fuse 20. A yieldable annulus 84 is disposed within the annular groove 82; and that yieldable annulus is shown as being hollow. The use of a hollow yieldable annulus decreases the amount of material that is needed to make that yieldable annulus; and it also enables that yieldable annulus to be made out of stiffer materials than could be used in making a solid yieldable annulus. For example, stiffer alloys of lead, aluminum and copper could be used in making the yieldable annulus 84 of FIG. 8 than could be used in making the yieldable annulus 26 of the electric fuse 20. The yieldable annulus 84 would preferably be made as an extrusion, and then cut to length. The lengths of that extrusion would preferably be cut so the ends of each length would overlap when that length was formed as a yieldable annulus and disposed within an annular groove.

FIG. 9 shows the left-hand end of a housing 90 which has a passage 92 therethrough and which has an annular groove 94 in the outer surface thereof adjacent the left-hand end thereof. The housing 90, the passage 92, and the annular groove 94 can be identical to the housing 22, the passage 25 and the annular groove 24 of the electric fuse 20. A yieldable annulus 96 is disposed within the annular groove 94; and that annulus is shown as being ovate in cross section. That yieldable annulus can be an elastomeric ring of ovate cross section. That yieldable annulus will be stretched to fit over the left-hand end of the housing 90 and then will be permitted to retract into and substantially fill the annular groove 94.

FIG. 10 shows the adjacent ends of a yielding annulus 100; and those ends are inclined to the edges of that yielding annulus. As a result, those ends will overlap each other when that yieldable annulus is disposed within an annular groove in a housing. The numeral 102 in FIG. 11 denotes a yieldable annulus; and the adjacent ends of that yieldable annulus are "stepped" in complementary fashion. As a result, those ends will overlap each other when that yieldable annulus is disposed within an annular groove in a housing. The numeral 104 in FIG. 12 denotes a yieldable annulus; and the adjacent ends of that yieldable annulus are "notched" in complementary fashion. As a result, those ends will overlap each other when that yieldable annulus is disposed within an annular groove in a housing.

Once the yieldable annuli 74, 84, 96, 100, 102 and 104 of FIGS. 7–12 have been disposed within annular grooves of housings, ferrules can be telescoped over the adjacent ends of those housings, and can have the free edges thereof cold-formed into holding engagement with those yieldable annuli. The free edges of those ferrules can be free of, or can be provided with, ridges 31 or indentations like the indentations shown by FIG. 6. The cold-forming of any split-ring yieldable annuli, such as the yieldable annuli 100, 102 and 104, will cause the adjacent ends of those yieldable annuli to flow together. As a result, the yieldable annuli provided by the present invention can effectively keep flames from escaping from the electric fuses of which they are component parts.

While a fusible element 46 is shown within the passage 25 in the housing 22, any desired form of electric device that can be telescoped within that passage can be used in the housing 22. Also, as indicated hereinbefore, the housing 22 will usually be provided with more than one axially directed passage.

The present invention makes it possible to utilize hard and unyielding housings, such as ceramic housings, for electric protective devices, without any need of precisely forming and then grinding the ends of those housings. Further, the present invention obviates the need of forming the cuplike portions of terminals with precisely held tolerances for the inner surfaces thereof. In addition, the present invention avoids the time and cost of drilling pin-receiving holes in the ferrules and housings for electric fuses, avoids the cost of those pins, and avoids the time and cost of pressing those pins into those holes. Moreover, the present invention makes it possible to use housings and ferrules which have commercial dimensional tolerances—both as to diameter and as to concentricity.

As a result, the present invention makes the use of ceramic tubes for electric protective devices sufficiently inexpensive to be commercially practicable. The use of such tubes is very desirable, because it obviates all of the charring and heat degrading which can occur when the housing of an electric protecting device is made from organic material. Also, the use of such tubes is very desirable because it enables the dimensions of the fuse to be stable in the presence of damp atmospheres or exceedingly dry atmospheres.

As indicated hereinbefore, it is possible to cold-form the free edges of ferrules so they penetrate the yieldable annuli to a depth sufficient to provide a hermetic seal. Even where those ferrules are not cold-formed to that extent, those ferrules are not cold-formed to that extent, those ferrules and the yieldable annuli will coact to provide seals that are tight enough to permit pressures to build up momentarily within the housings of the electric fuses. This is desirable; because such pressures will help extinguish any arcs that tend to form as the fusible elements within those housings fuse to open the circuits.

Where the yieldable annuli are made of metal, they will facilitate the transfer of heat from the housings to the terminals. This is desirable; because it will facilitate the dissipation of heat to the fuse clips or other fuse-holding contacts of the circuit.

The terminals shown in FIGS. 1–6 are cuplike knife-blade terminals: and such terminals are very useful. If desired, however, ferrulelike terminals could be used instead of cuplike knife-blade terminals. Also, while the ferrule 28 and the securing blade 32 of the electric fuse 20 can be soldered together after the ferrule has been telescoped onto the left-hand end of the housing 22, that ferrule and that blade could be soldered together before that ferrule is telescoped onto that end. In fact, if desired, that ferrule and that blade could be cast as a single piece or could be machined out of a single piece of stock.

Whereas the drawing and accompanying description have shown and described several preferred embodiments of the present invention, it should be apparent to those skilled in the art that various changes may be made in the form of the invention without affecting the scope thereof.

What I claim is:

1. An electrical device which comprises: a housing *of frangible and unyieldable material* that has at least one passage therein and that has annular grooves *in the outer surface thereof* adjacent *and surrounding* the opposite ends of [the] *said* outer *surface* [thereof], yieldable annuli disposed within said annular grooves, an electrical element disposed within said passage in said housing, a cuplike terminal telescoped over one end of said housing and having the free edge thereof *in register*

*with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* and a second cuplike terminal telescoped over the opposite end of said housing and having the free edge thereof *in register with the other of said annular grooves and in register with the yieldable annulus within said other of said annular grooves,*

*said second cuplike terminals having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminals from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing.

2. An electrical device as claimed in claim 1 wherein said yieldable annuli are split rings and are made of relatively inextensible material.

3. An electrical device as claimed in claim 1 wherein said housing is made of ceramic material, wherein said electrical element is a circuit-protecting element, and wherein said electrical element generates heat as it performs its circuit-protecting function.

4. An electrical device as claimed in claim 1 wherein said yieldable annuli are split rings, wherein one end of one of said yieldable annuli overlaps the other end of said yieldable annulus, wherein one end of another of said yieldable annuli overlaps the other end of said other yieldable annulus, wherein said ends of said one yieldable annulus are cold-formed together, and wherein said ends of said other yieldable annulus are cold-formed together.

5. An electrical device as claimed in claim 1 wherein said yieldable annuli are hollow and are made of relatively stiff material.

6. An electrical device as claimed in claim 1 wherein said cuplike terminals have locking ridges at the inner surfaces thereof that are cold-formed into the outer surfaces of said yieldable annuli.

7. An electrical device which comprises: a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, said yieldable annuli intimately abutting the axially outer ends of said annular grooves, and said yieldable portions effectively acting as extensions of said outer surface of said housnig.

8. An electrical device which comprises: a housing *of frangible and unyieldable material* that has at least one passage therein and that has annular grooves *in the outer*

*surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, said yieldable annuli being split rings, one end of one of said yieldable annuli overlapping the other end of said one yieldable annulus, and one end of another of said yieldable annuli overlapping the other end of said other yieldable annulus.

9. An electrical device which comprises: a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli ]*annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagement between the cold-formed free edges of said cuplike terminals and said yieldable annuli holding said cuplike terminals in assembled relation with said housing, and said free edges of said cuplike terminals extending far enough into the outer surfaces of said yieldable annuli to permit pressures to build up momentarily within said housing as said electrical element fuses.

10. An electrical device which comprises: a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, said housing being made of heat-conducting ceramic material, and said yieldable annuli being made of metal and facilitating transfer of heat from said housing to said cuplike terminals.

11. An electrical device which comprises: a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, and said yieldable annuli underlying and intimately engaging the inner surfaces of said free edges of said cuplike terminals to prevent rotation of said cuplike terminals relative to said housing.

12. An electrical device which comprises a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge*

*thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first said cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, and said yieldable annuli being wound into said annular groves as multilayer yieldable annuli.

13. An electrical device which comprises a housing *of frangible and unyieldable material* that has at least one passage therein and that has annular grooves *in the outer surface thereof* adjacent *and surrounding* the opposite ends of [the] *said* outer surface [thereof], yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed into *said* one of said annular grooves and into [one of] said yieldable [annuli] *annulus within said one of said annular grooves,* a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed into [the] *said* other of said annular grooves and into [the other of] said yieldable [annuli] *annulus within said other of said annular grooves,* said free edge of the first said cuplike terminal defining a cross section smaller than the cross section of the ungrooved portion of said housing, whereby said free edge of said first said cuplike terminal and one edge of said one of said annular grooves coact to positively and physically block accidental separation of said first and cuplike terminal from said housing,

*said free edge of said first said cuplike terminal extending axially beyond said one edge of said one of said annular grooves but stopping short of the opposite edge of said one of said annular grooves,*

*said free edge of said first said cuplike terminal and said yieldable annulus within said one of said annular grooves coacting to prevent movement of said first said cuplike terminal relative to said one of said annular grooves,* said free edge of said second cuplike terminal defining a cross section smaller than the cross section of the ungrooved portion of said housing, whereby said free edge of said second cuplike terminal and one edge of said other of said annular grooves coact to positively and physically block accidental separation of said second cuplike terminal from said housing,

*said free edge of said second cuplike terminal extending axially beyond said one edge of said other of said annular grooves but stopping short of the opposite edge of said other of said annular grooves,*

*said free edge of said second cuplike terminal and said yieldable annulus within said other of said annular grooves coacting to prevent movement of said second cuplike terminal relative to said other of said annular grooves,* the engagements between the cold-formed free edges of said cuplike terminals and said yieldable annuli holding said cuplike terminals in assembled relation with said housing, and said cuplike terminals having locking indentations in the free edges thereof that are cold-formed into the outer surfaces of said yieldable annuli as said free edges of said cuplike terminals are cold-formed into said annular grooves.

14. An electrical device which comprises:

a housing *of frangible and yieldable material* that has at least one passage therein, yieldable annuli disposed adjacent *and surrounding* the opposite ends of said housing, an electrical element disposed within said passage in said housing, a cuplike terminal telescoped over one end of said housing *with the free edge thereof in register with one of said yieldable annuli* and having [the] *said* free edge thereof cold-formed so it extends inwardly toward said housing and so it extends into and permanently remains within *said* one of said yieldable annuli, and a second cuplike terminal telescoped over the opposite end of said housing *with the free edge thereof in register with the other of said yieldable annuli* and having [the] *said* free edge thereof cold-formed so it extends inwardly toward said housing and so it extends into and permanently remains within [the] *said* other of said yieldable annuli,

*said free edge of the first said cup-like terminal having an inner diameter smaller than the un-stressed outer diameter of said one of said yieldable annuli whereby said free edge of said first said cuplike terminal and said one of said yieldable annuli coact to positively and physically block accidental separation of said first said cup-like terminal from said one of said yieldable annuli,*

*said free edge of said first said cuplike terminal extendtending axially beyond one edge of said one of said yieldable annuli but stopping short of the opposite edge of said one of said yieldable annuli,*

*whereby a portion of the outer periphery of said one of said yieldable annuli is exposed and is not overlain by said first said cup-like terminal,*

*said free edge of said second cup-like terminal having an inner diameter smaller than the un-stressed outer diameter of said second of said yieldable annuli whereby said free edge of said second cup-like terminal and said other of said yieldable annuli coact to positively and physically block accidental separation of said second cup-like terminal from said other of said yieldable annuli,*

*said free edge of said second cuplike terminal extending axially beyond one edge of said other of said yieldable annuli but stopping short of the opposite edge of said other of said yieldable annuli,*

*whereby a portion of the outer periphery of said other of said yieldable annuli is exposed and is not overlain by said second cup-like terminal,* the engagements between the cold-formed free edge of said cup-like terminals and said yieldable annuli providing positive locking action which holds said cup-like terminals in assembled relation with said housing.

15. An electrical device which comprises:

a housing that has at least one passage therein, an electrical element disposed within said passage in said housing, a cuplike metal terminal telescoped over one end of said housing, a second cuplike metal terminal telescoped over the other end of said housing, said electrical element having a length shorter than the length of said housing, said electrical element having the opposite ends thereof confronting the flat inner faces of said cuplike metal terminals, at least one of said ends of said electrical element being spaced inwardly of the flat face of the adjacent cuplike metal terminal, and each of said cuplike metal terminals having a ferrule and a securing blade that are initially secured together by mechanical means and that are subsequently secured together and are electrically bonded to said electrical element by solder.

16. An electrical device which comprises:

a housing *of frangible and unyieldable material* that has at least one passage therein and that has annular grooves adjacent *and surrounding* the opposite ends of the outer surface thereof, yieldable annuli disposed within said annular grooves, an electrical element disposed within said passage in said housing, a cuplike terminal telescoped over one end of said housing and having the free edge thereof *in register with one of said annular grooves and in register with the yieldable annulus within said one of said annular grooves,*

*said cuplike terminal having said free edge thereof* cold-formed so it extends inwardly toward said housing and so it extends into *said* one of said annular grooves and into [one of] said yieldable [annuli] *annulus within said one of said annular grooves,* and a second cuplike terminal telescoped over the opposite end of said housing and having the free edge thereof *in register with the other of said annular grooves and in register with the yieldable annulus within said other of said annular grooves,*

*said second cuplike terminal having said free edge thereof* cold-formed so it extends inwardly toward said housing and so it extends into [the] *said* other of said annular grooves and into [the other of] said yieldable [annuli] *annulus within said other of said annular grooves,* said cold-formed free edges of said cuplike terminals having diameters larger than the inner diameters of said annular grooves but smaller than the outer diameter of said annular grooves,

*whereby said cold-formed free edges of said cuplike terminals coact with the outermost edges of said anular grooves to positively and physically block accidental separation of said cuplike terminals from said housing,*

*said free edge of said first said cuplike terminal extending axially beyond said outermost edge of said one of said annular grooves but stopping short of the opposite edge of said one of said annular grooves,*

*whereby a portion of the outer periphery of said one of said yieldable annuli is exposed and is not overlain by said first said cup-like terminal,*

*said free edge of said second cuplike terminal extending axially beyond said outermost edge of said other of said annular grooves but stopping short of the opposite edge of said other of said annular grooves,*

*whereby a portion of the outer periphery of said other of said yieldable annuli is exposed and is not overlain by said second cup-like terminal,* said cold-formed free edges of said cuplike terminals coacting with the endmost edges of said annular grooves to provide a positive locking action that prevents accidental separation of said cuplike terminals from said housing.

References Cited

The following references, cited by the Examiner, are of record in the patented file of this patent or the original patent.

UNITED STATES PATENTS

| | | | |
|---|---|---|---|
| 2,639,350 | 5/1953 | Cox | 337—248 |
| 3,222,482 | 12/1965 | Hitchcock | 337—252 |
| 2,934,626 | 4/1960 | Burdeshaw | 337—249 |

FOREIGN PATENTS

| | | | |
|---|---|---|---|
| 195,987 | 2/1958 | Austria | 337—252 |
| 665,052 | 1/1952 | Great Britain | 337—246 |

HAROLD BROOME, Primary Examiner

U.S. Cl. X.R.

337—246